A. H. WRIGHT.
ADVERTISING APPARATUS.
APPLICATION FILED FEB. 11, 1913.

1,063,929.

Patented June 3, 1913.

Inventor.
Arthur Harry Wright.

UNITED STATES PATENT OFFICE.

ARTHUR HARRY WRIGHT, OF SYDNEY, NEW SOUTH WALES, AUSTRALIA.

ADVERTISING APPARATUS.

1,063,929.  Specification of Letters Patent.  Patented June 3, 1913.

Application filed February 11, 1913. Serial No. 747,745.

*To all whom it may concern:*

Be it known that I, ARTHUR HARRY WRIGHT, subject of the King of Great Britain and Ireland, residing at 72B King street, Sydney, New South Wales, Australia, have invented new and useful Improvements in Advertising Apparatus; and I do hereby declare the following to be a full, clear, and exact description of the same.

This invention relates to apparatus for displaying advertisements, information sheets and the like.

The object of the invention is to provide mechanism that will give an automatic reverse to the traveling bands while the handle or other operating means rotate in the same direction. And further, to provide suitable mechanism for operating, driving and controlling the advertisements, or information and panoramic sheets or bands used in connection therewith and for indexing the same.

To these and other ends my invention consists in certain novel features and combinations such as will be more fully described hereinafter and particularly pointed out in the claims.

The invention will be fully described with the aid of the accompanying drawings forming part of this specification in which similar figures of reference indicate the same parts throughout the different views:—

Figure 1:
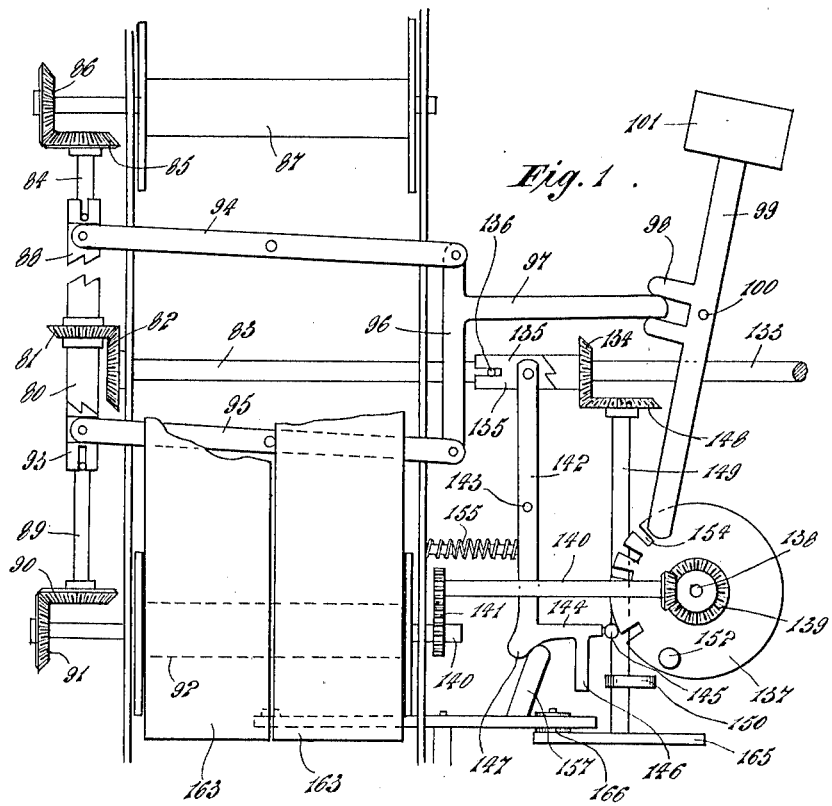
Figure 2:
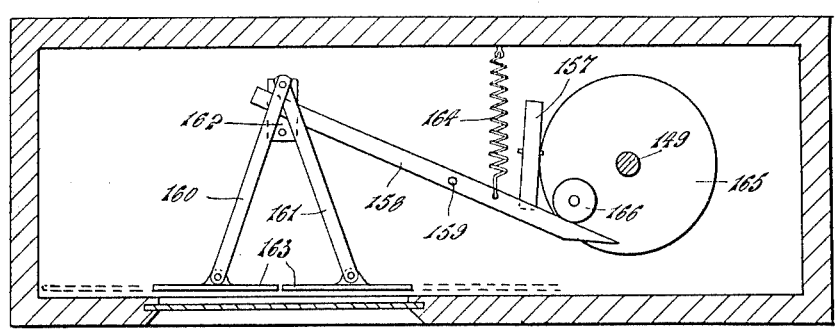

Referring now to Figures 1 and 2, the mechanism shown therein comprises a sleeve 80 suitably mounted in bearings, having a bevel wheel 81 fixed thereto and gearing with a bevel wheel 82 on the end of a driving spindle 83. A spindle 84 has a bevel gear wheel 85 fixed upon its end and gears with a gear wheel 86 fixed upon the end of the spindle of the roller 87. A sleeve 88 is fixed upon the spindle 84 and provided with clutch teeth adapted to engage clutch teeth formed upon the end of the sleeve 80.

A spindle 89 has a bevel wheel 90 fixed upon its end and gears with a bevel wheel 91 fixed on the end of the spindle of the roller 92. This spindle 89 has a sleeve 93 fixed upon it similar to the sleeve 88 and has clutch teeth adapted to engage clutch teeth upon the other end of the sleeve 80. Links 94 and 95 pivoted at their centers to a suitable part of the frame are pivotedly connected at one end to the sleeves 88 and 93 respectively and at their other ends to a bracket 96. This bracket has an arm 97 engaging between stops 98 which are fixed to an arm 99 pivoted at 100 and having a weight 101 at its upper end.

Figs. 1 and 2 illustrate mechanism whereby the band is automatically stopped when a certain portion thereof comes to the front and shutters in front of the cabinet automatically open at the same time, the shutters remaining open and the band remaining stopped for a predetermined time. The shutters close and the band then continues to travel until another portion of said band is desired to be shown, the band then stops and the shutters open as before. This is continued until all the matter upon the band has been displayed in the same way. When the full length of the band is reached it is automatically reversed by the mechanism already described.

Upon the driving shaft 133 is fixed a bevel gear wheel 134, the collar portion having clutch teeth formed upon it. A sleeve 135 provided with clutch teeth slides upon the spindle 83, a pin 136 projecting from the said spindle engages a slot in the sleeve. The clutch teeth are adapted to engage with the clutch teeth in the collar of the wheel 134. A disk 137 is mounted upon a spindle 138 and driven by means of bevel gears 139 which are in turn driven from the spindle 140 of the lower roller through the medium of toothed wheels 141. A lever 142 pivoted near its center at 143 is pivotedly connected at its upper end to the sleeve 135, while its lower end is provided with an arm 144 having a roller 145 at the end thereof. A member 146 projects from this arm in a downward direction while a heel 147 is formed on the lower end of the lever. The bevel wheel 134 upon the spindle 133 drives another bevel wheel 148 fixed upon the top end of a shaft 149 which has fixed upon it a cam 150 adapted to contact with the member 146 of the lever 142. A pin 152 projecting from the disk 137 contacts with and operates the weighted lever 99 which operates the clutches and reverses the travel of the band as already described. As the band travels forward the disk 137 will be rotated through the medium of the spindle 140 and gear wheels and when a slot 154 of the disk 137 is opposite the roller 145 a compression spring 155 will force the lever 142 forward and the roller 145 will pass into a slot 154 and at the same time moving the sleeve 135 out of engagement with the clutch teeth upon the shoulder of the bevel wheel 134. The band is therefore automatically stopped and will remain so until such time as the cam 150 upon the spindle 149 rotates sufficiently to contact with the member 146 and so return the lever 142 into its normal position and the clutches into engagement. The disk then rotating the lever is held in position by means of the roller 145 riding upon the periphery of the disk.

The shutters are caused to open when the band is stopped by the following mechanism:—As the lever 142 moves forward the heel 147 depresses one end of a lever 157, the other end of this lever is thus forced out of engagement with a lever 158 (see Fig. 2) which is pivoted at or near its center upon a pin 159, the outer end of the lever projects through the ends of links 160 and 161 and is slidable in a socket 162 connected to the said links. The links are each pivoted to shutters 163, these shutters are suitably guided so that they will slide freely. Immediately the end of the lever 157 is disengaged from the lever 158, the coil spring 164 (see Fig. 2) will immediately operate the lever 158 drawing it forward and forcing the shutters apart and thereby displaying the advertisements upon the band. Immediately the cam 150 upon the spindle 149 contacts with the member 146 of the lever 142, the disk 165 fixed upon the end of the spindle 149 will be in such a position that a roller 166 pivoted upon the upper face thereof will contact with the lever and return it to the position shown in Fig. 2 thereby closing the shutters, in which position they will remain until the roller 145 upon the lever 142 again passes into a slot in the disk 137.

What I claim as new and desire to secure by Letters Patent of the United States is:—

1. In an apparatus for the purpose described, the combination of a casing having a display opening, a pair of rollers mounted in said casing, a band carried by said rollers for alternate winding from one to the other of said rollers, an intermittent driving means, means for connecting said driving means alternately to each of said rollers to wind said band from roller to roller in front of said display opening, shutters for closing said display opening when the rollers are being actuated, spreading mechanism connected to said shutters for separating them to clear said opening when the rollers are stopped, spring means for actuating said spreading means, a catch for holding said shutters in closed position, a rotary element driven by said driving means, and means controlled by said rotary element for releasing said catch.

2. In an apparatus for the purpose described, the combination of a casing having a display opening, a pair of rollers mounted in said casing, a band carried by said rollers for alternate winding from one to the other of said rollers, an intermittent driving means, means for connecting said driving means alternately to each of said rollers to wind said band from roller to roller in front of said display opening, shutters for closing said display opening when the rollers are being actuated, spreading mechanism connected to said shutters for separating them to clear said opening when the rollers are stopped, spring means for actuating said spreading means, a catch for holding said shutters in closed position, a recessed rotary element driven by said driving means, and means controlled by said rotary element for releasing said catch and for controlling said intermittent driving means, said means engaging the recesses in said disk at intervals to stop the band and release said catch.

In testimony whereof, I have signed my name to this specification in the presence of two subscribing witnesses.

ARTHUR HARRY WRIGHT.

Witnesses:
J. APPLEBY,
H. C. CAMPBELL.

---

Copies of this patent may be obtained for five cents each, by addressing the "Commissioner of Patents, Washington, D. C."